(12) United States Patent
Smadja

(10) Patent No.: US 6,687,687 B1
(45) Date of Patent: Feb. 3, 2004

(54) DYNAMIC INDEXING INFORMATION RETRIEVAL OR FILTERING SYSTEM

(75) Inventor: Frank Smadja, Haifa (IL)

(73) Assignee: ZIX SCM, Inc., Dallas, TX (US)

( * ) Notice: Subject to any disclaimer, the term of this patent is extended or adjusted under 35 U.S.C. 154(b) by 236 days.

(21) Appl. No.: 09/625,945

(22) Filed: Jul. 26, 2000

(51) Int. Cl.[7] .............................................. G06F 17/30
(52) U.S. Cl. ............................ 707/2; 707/2; 707/200; 707/203; 707/205; 711/100; 711/170; 711/171; 711/173
(58) Field of Search ................................. 711/100, 170, 711/171, 172, 173; 707/2, 205, 200, 203

(56) References Cited

U.S. PATENT DOCUMENTS

| | | | | |
|---|---|---|---|---|
| 4,991,087 A | * | 2/1991 | Burkowski et al. ............. 707/3 |
| 5,704,060 A | * | 12/1997 | Del Monte ............... 707/104.1 |
| 5,784,699 A | * | 7/1998 | McMahon et al. ........... 711/171 |
| 5,913,209 A | * | 6/1999 | Millett ........................... 707/3 |
| 6,374,340 B1 | * | 4/2002 | Lanus et al. ................. 711/173 |

OTHER PUBLICATIONS

Witten et al., "Indexing and Compressing Full Text Databases for CD–ROM", Dec. 1990, Journal of Information Science.*

* cited by examiner

Primary Examiner—Kim Vu
Assistant Examiner—Chongshan Chen
(74) Attorney, Agent, or Firm—Lahive & Cockfield, LLP

(57) ABSTRACT

A system and method for allocating the blocks of index file to the postings for words found in documents of a database is disclosed. The index file is provided with blocks that is partitioned into successively decreasing levels of blocks in size. The blocks in each successive level have same size and the sum of sizes of blocks in each successive level equals the size of initial block. An information retrieval interface allocates to the postings for a word a free block in the level the size of which is closest to the size of postings for the word in the index file.

18 Claims, 8 Drawing Sheets

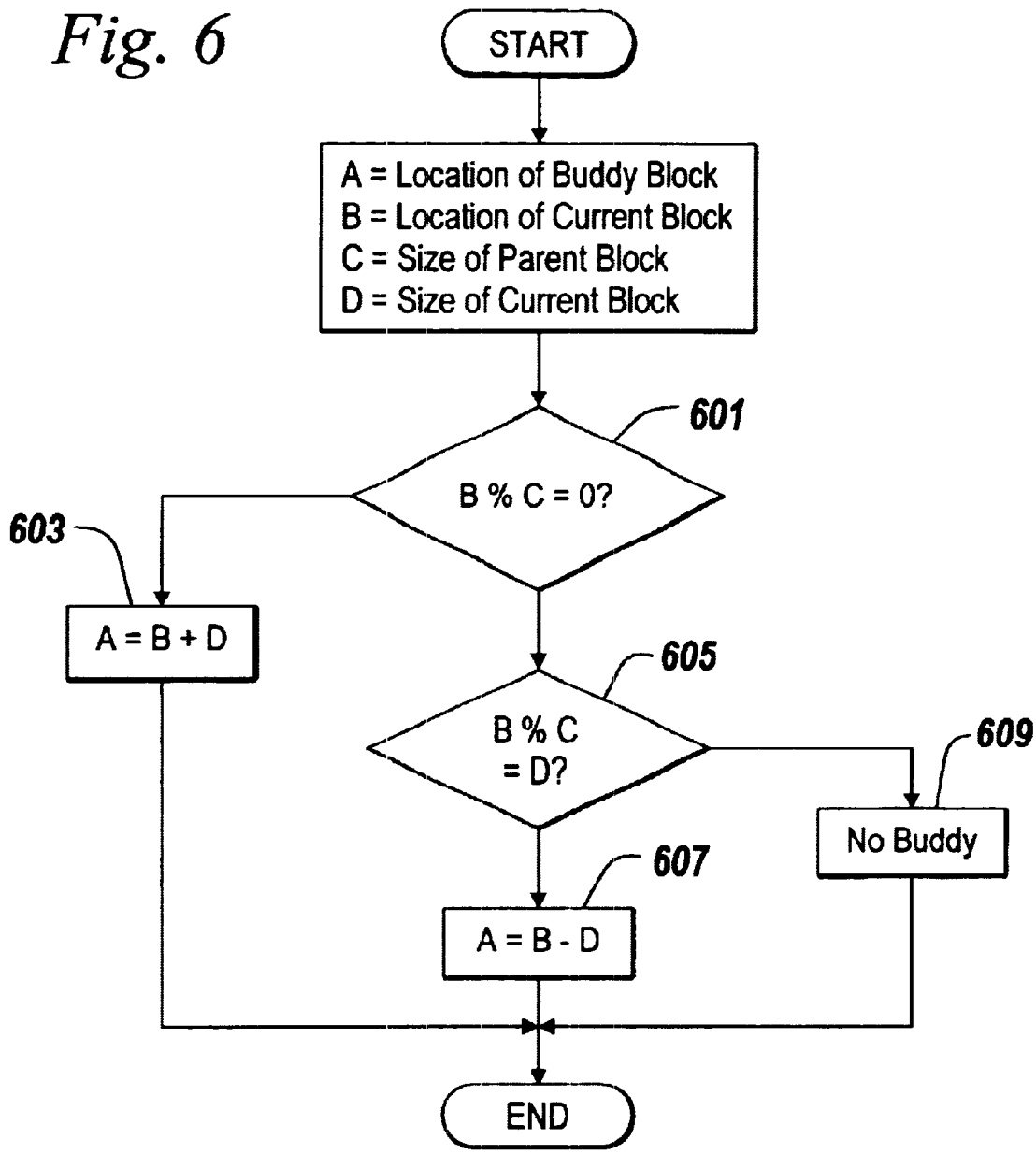

DYNAMIC INDEXING INFORMATION RETRIEVAL OR FILTERING SYSTEM

TECHNICAL FIELD

The present invention relates generally to information retrieval or filtering systems and more particularly to methods for dynamically indexing words contained in a set of documents in information retrieval or filtering system.

BACKGROUND OF THE INVENTION

Information retrieval or filtering systems generally employ an index file that indexes information stored in a database. The index file is used to locate information in the database. The index file contains reference information for respective words, where for each word, the reference information points to occurrences of the word in documents stored in the database. The reference information for a word is also referred as "postings" of the word.

Most indexing techniques are "static" because the indexing employed in such techniques is performed in two phases. In the first phase of the indexing, input files are usually read to build some temporary internal files. In the second phase of the indexing, the temporary internal files are optimized to prepare for retrieval. Hence, the indices are static once the optimization is complete. That is, it is impossible to add new documents without rebuilding the whole index. Queries for the retrieval of documents cannot be completed until the second phase of the indexing is performed.

Dynamic indexing techniques have been introduced to overcome the limitations of static indexing techniques. Indexes are accumulated in an index file that is checked without the optimization of an internal file at each time for retrieval queries. In the conventional dynamic indexing technique, the index file is organized into a set of fixed length of blocks where postings for words are stored. The blocks pack postings for several words together with more or less free space. An address record table is kept to store the block number for each posting, and a free block list is kept to store information about blocks containing a sufficient amount of free space (see, "Managing Gigabytes, Compressing and Indexing Documents and Images," by I. Witten, A. Moffat and T. Bell).

In such conventional indexing techniques, it takes a long time to update the index file when new documents are added to the database and the collection of indexes grows larger. In addition, the amount of free space needed at each time of updating the postings for words is unpredictable.

SUMMARY OF THE INVENTION

The present invention provides information retrieval system or filtering systems for dynamically indexing a set of documents in a database. In particular, the present invention provides methods for indexing a set of documents in a single phase. Information retrieval or filtering systems of the present invention are able to respond to retrieval queries without generating and optimizing internal files.

A single phase indexing technique of the present invention enables the database to be queried at all times. The present invention provides information retrieval or filtering systems that respond to retrieval queries while in the process of indexing. In order to allow retrieval at all times, the present invention stores postings for a word sequentially in memory so that the postings can be retrieved from the memory with a minimum number of input/output (I/O) operations.

The present invention allows information retrieval or filtering systems to incrementally store and update postings for a word while keeping each postings for a word sequentially on memory space. When a new document is inserted in a database which contains many words, the present invention provides information retrieval or filtering systems where the postings for all these words are expanded in a manner of "multipoint insertion" rather than a simple append operation.

In accordance with one aspect of the present invention, a method for allocating the blocks of index file to the postings for words found in documents of a database is provided. The index file is provided with a predetermined size of initial block and the block is partitioned into successively decreasing sized blocks. A block is divided into n blocks of a successive level. The blocks in each successive level have same size. The sum of sizes of blocks in each successive level equals the size of initial block. An information retrieval interface allocates to the postings for a first word a free block in the closest matching level to the size of postings for the first word in the index file. The size of the free block is able to accommodate holding the postings for the first word in the index file.

In accordance with another aspect of the present invention, a method for updating postings for words in an index file is provided. An information retrieval interface allocates blocks of the index file to the postings for words contained in the index file. The blocks are partitioned into successively decreasing levels of blocks in size. The information retrieval interface updates postings for a word in a first block of the index file. The updated postings contain additional postings for the word in added documents of the database. The information retrieval interface searches from a free block list a second block that is free to accommodate the updated postings for the word. The free block list contains information about whether or not a block is free. The information retrieval interface moves the postings for the word from the first block to the second block.

In accordance with a further aspect of the present invention, method for allocating an index file containing postings for words found in documents of a database is provided. The index file is provided with blocks that are partitioned into successively decreasing levels of blocks in size. The blocks in each successive level have same size. The size of postings for a word in the index file is calculated to determine a level that is closest to the postings for the word in the block structure. A free block is searched within the level from a free block list containing information about free blocks of the level to accommodate holding the postings for the word. The free block in the level is allocated to the postings for the word.

A single phase indexing technique of the present invention makes it possible to construct static databases in multiple batches and develop dynamic systems such as information filtering systems. A single phase indexing technique of the present invention enables information retrieval or filtering systems to respond to retrieval queries while in the process of indexing without reorganizing internal files. The present invention supports a collection of dynamically changing variable-length postings for words.

BRIEF DESCRIPTION OF THE DRAWINGS

An illustrative embodiment of the present invention will be described below relative to the following drawings.

FIG. 6 is a flowchart of the detailed steps that are performed in the step of calculating the location of a buddy block in FIG. 5.

DETAILED DESCRIPTION OF THE INVENTION

The illustrative embodiment of the present invention concerns a system that provides dynamic indexing of documents stored in a database. In particular, the documents stored in the database are indexed in a single phase rather than in multiple phases. The illustrative embodiment of the present invention provides a method for incrementally storing and updating postings for words while postings for a word are stored sequentially on memory space. A "multi-point insertion" scheme is employed to expand the postings for all words contained in a new document inserted in a database rather than employing appending operation.

A single phase indexing technique eliminates the need for an internal file to respond to retrieval queries. In the illustrative embodiment, the database can be queried at all times, even while documents are being indexed. As a result, the single phase indexing techniques of the illustrative embodiment of the present invention provide information retrieval or filtering systems that respond to retrieval queries while in the process of indexing without the need for internal files.

The illustrative embodiment of the present invention generates an index file that contains reference information for words. The reference information points to occurrences of the words in documents stored in the database. The portions of the reference information for a word pointing to occurrences of the word are referred to as "postings for the word". The index file holds the postings for all words in all documents in a database. If a word has been seen in the documents 1, 2 and 35, the index file contains indicators of the three occurrences with additional numerical information needed for retrieval purposes.

Figure 1:
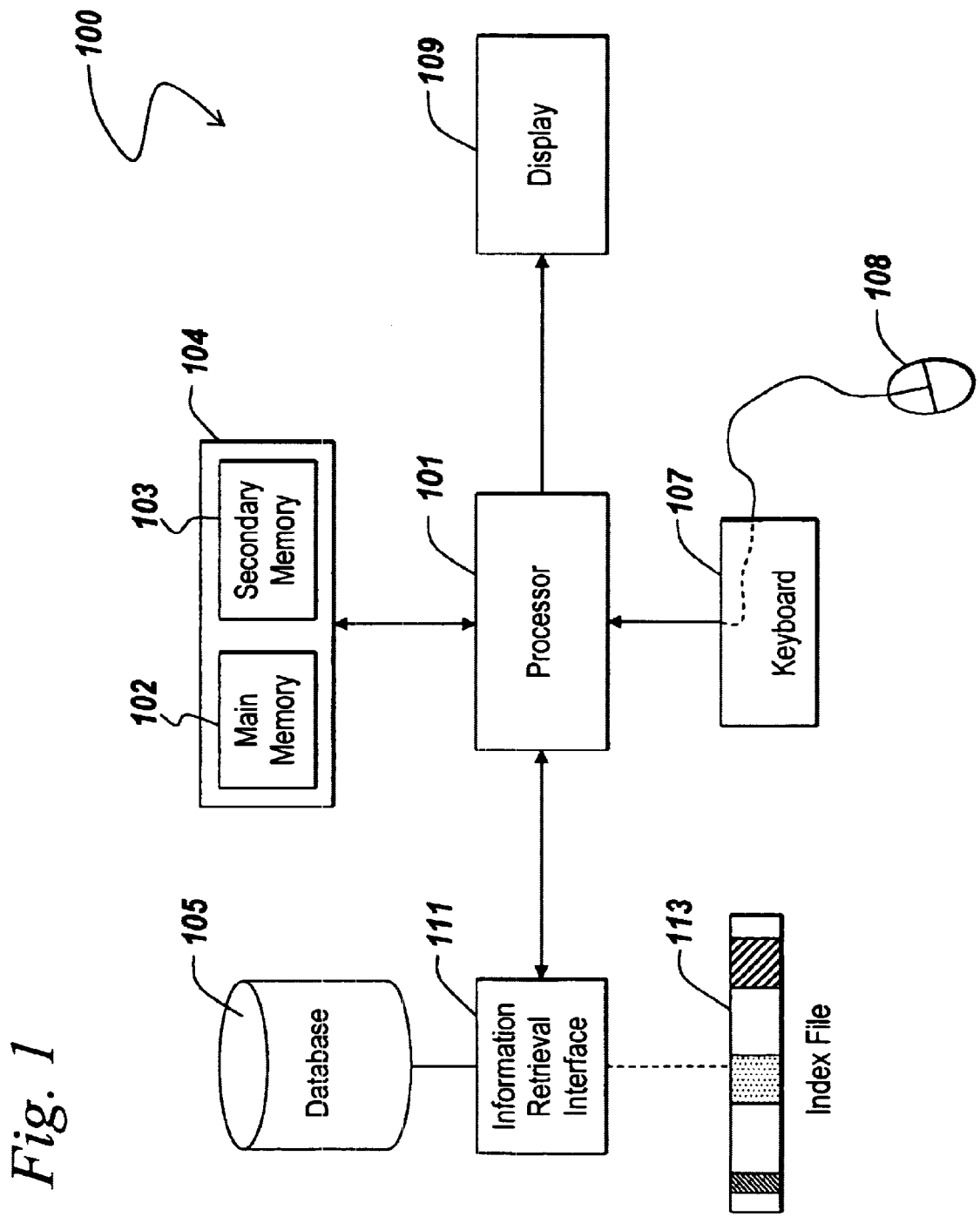
FIG. 1 is a block diagram of computerized information retrieval or filtering system in which the illustrative embodiment of present invention may be implemented.

FIG. 1 is a block diagram of computerized information retrieval or filtering system that is suitable for practicing the illustrative embodiment of the present invention. The computer system 100 includes a processor 101, a memory device 103, a database 105, input devices 107 and 108, a display device 109 and an information retrieval interface 111. The processor 101 controls the entire operation of the information retrieval or filtering system 100 based on the codes stored in a memory device 103. The processor 101 may be any of a number of commercially available microprocessors. The memory device includes a main memory device 102 which stores program codes of instructions used to operate the information retrieval or filtering system, and a secondary memory device 104 which stores program data used to operate the information retrieval or filtering system. The database 105 contains a set of documents to be retrieved by the information retrieval or filtering system 100. The input device including a keyboard 107 and a mouse 108 may be used for entering alphanumeric and other information to make a query for retrieval of documents stored in the database 105. The display device 109 may be a CRT display or LCD display. The display device 109 displays the result of retrieval queries responded by the information retrieval or filtering system 100. The information retrieval interface 111 generates an index file 113 containing postings for words contained in the documents of the database 105. The information retrieval interface 111 retrieves the documents stored in the database 105 by using the index file 113 in responding to the retrieval query input from the keyboard 107 or mouse 108. The function of the information retrieval 111 interface is described below in more detail.

Figure 2:
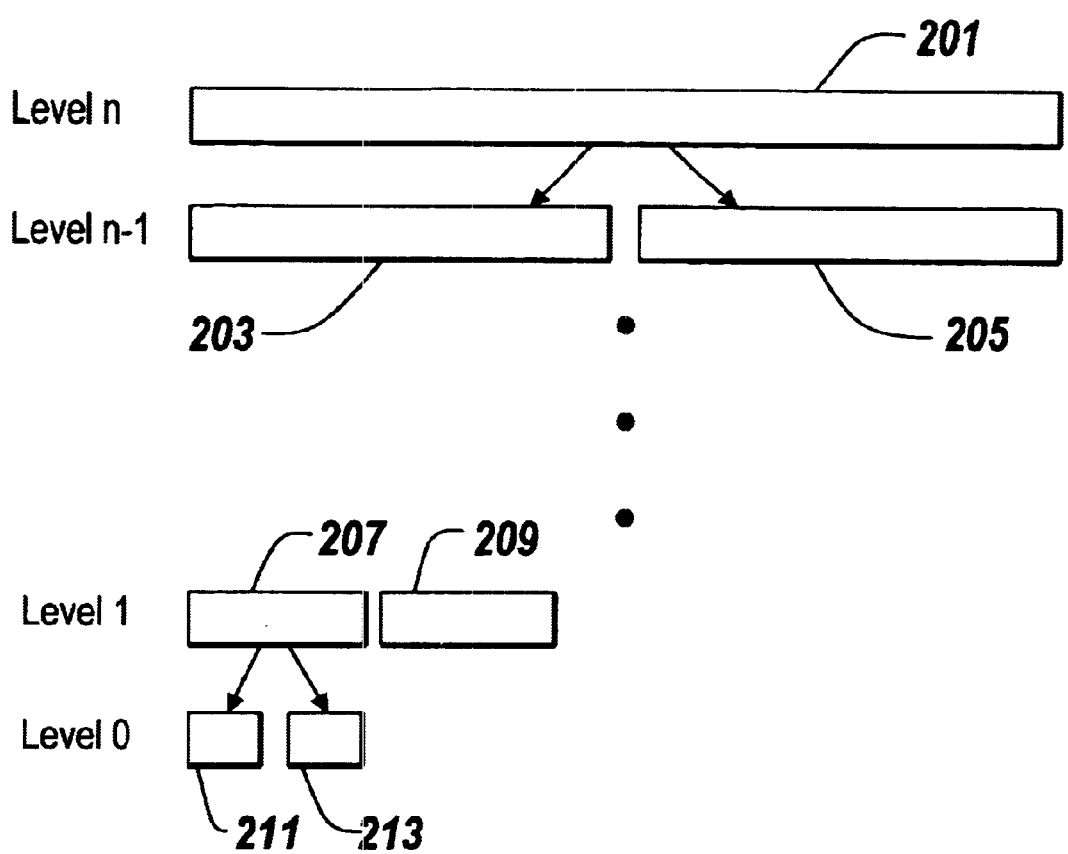
FIG. 2 is an illustrative block structure of an index file stored in a storage element in the illustrative embodiment of the present invention.

The illustrative embodiment of the present invention partitions the index file into blocks that are of successively decreased size. The blocks in each level have the same size, and the total size of all blocks for each level is equal. FIG. 2 shows an example of a structure of an index file that is partitioned into blocks in the illustrative embodiment of the present invention. The blocks represent portions of memory for the index file. Initially, the index file is provided with a predetermined sized single block, which can be partitioned into successively decreasing sized blocks. The block structure shown in FIG. 2 ranges from a top level to a bottom level. The top level is referred to as level n, and the bottom level is referred to as level 0. The top level holds a single large initial block. The bottom level of the block structure holds minimum sized blocks. A small minimum block size minimizes the amount of memory wasted due to fragmentation.

In the illustrative embodiment of the present invention, the block 201 in the top level (level n) is partitioned in to two equal sized blocks 203 and 205 in level n−1 in the illustrative embodiment. Between successive levels, each block in the higher level is partitioned into two blocks of equal size in the lower level until level 0 is reached. Thus, a block 207 in level 1 is partitioned into two equal sized of blocks 211 and 213 in the bottom level (level 0). Blocks 201 and 207 are referred to as "parent blocks" and blocks 203, 205, 211 and 213 are referred to as "child blocks." Those skilled in the art will appreciate that the block structure shown in FIG. 2 is merely illustrative and each parent block may include more than two children blocks.

Blocks 203 and 205 and blocks 211 and 213 are "siblings" of each other. Sibling blocks are also known as "buddies" in that they are subdivisions of a same parent block. Because each parent block is divided into two equal sized child blocks in the illustrative embodiment of the present invention, the size of parent block is twice of the size of child block. If the size of a block in the bottom level is unity, the size of a block in level 1 is $2^1$ or 2. Consequently, the size of initial block in level n is $2^n$. Those skilled in the art will appreciate that the blocks shown in FIG. 2 may be divided into more than two child blocks. If the parent block is divided into three equal child blocks, the parent block is three times of the child block. If the size of a block in the bottom level is unity, the size of a block in level n is n-th power of $3^n$.

Each block of the index file is associated with control information, such as TAG, SIZE and FREE fields, stored in a control file. The TAG field is one bit in length and indicates if the block is free or used. The SIZE field holds an integer for indicating the size of the block and the FREE field specifies the remaining free space within the block. The TAG field is a bit assigned to represent a status of a block. A "1" value for the status bit of a block indicates that the block is not free. Hence, the TAG value of "1" for a block indicates that at least one of child blocks of the block represented by the TAG field is used for the postings for words. In contrast, a "0" value for the TAG field indicates that the block is free. The control information is described below in more detail. The integer held in the SIZE field indicates the size of the block. For example, a value of k in the SIZE field implies that the block size is $(2^k)*$(the minimum block size). When the index file is opened, the control file containing the control information is read from the secondary memory device 104 into the main memory device 102. When closing the index file, all control information kept in the main memory device 102 is written into the control file, and the control file is stored in the secondary memory device 104.

Figure 3:
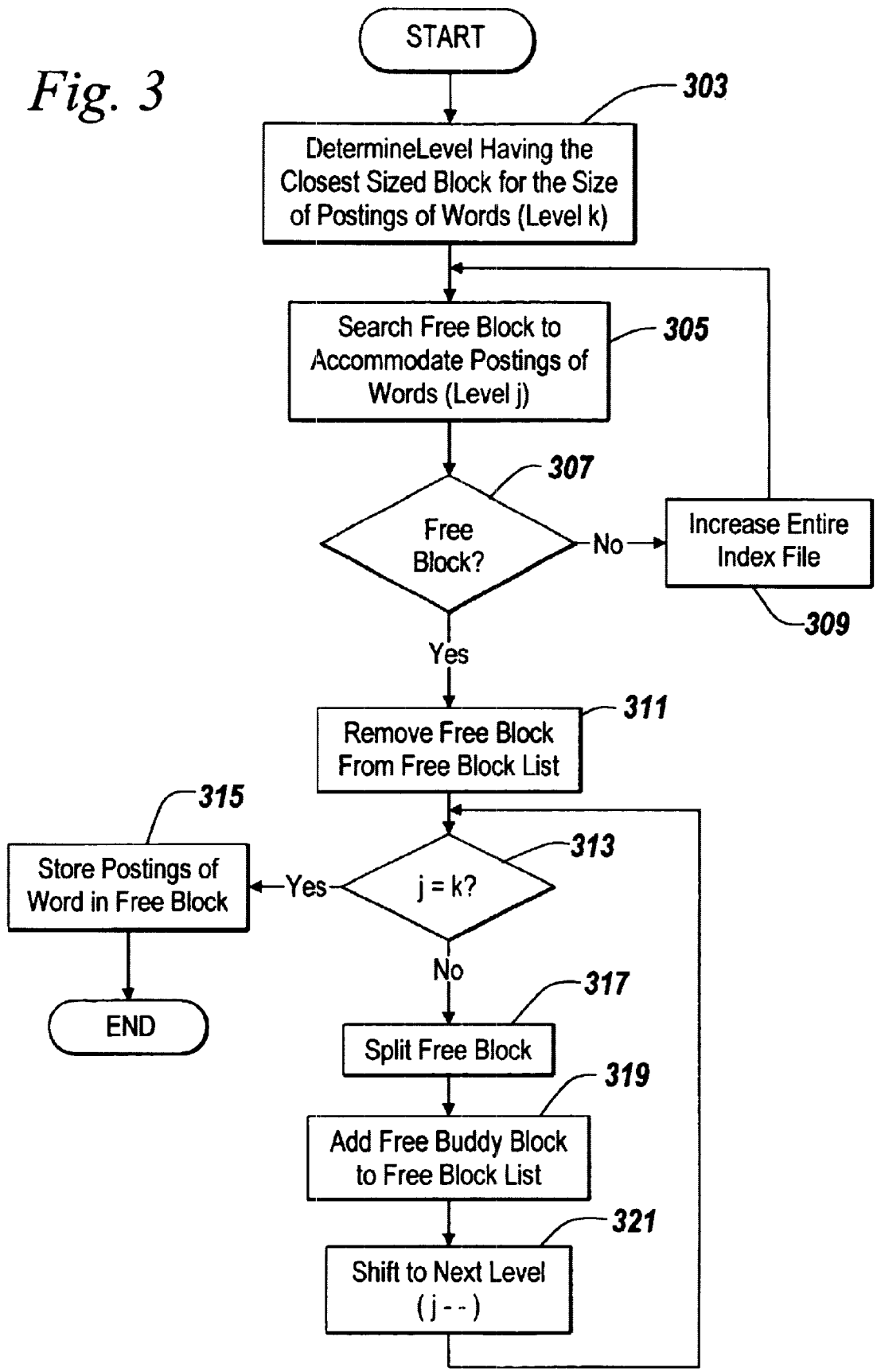
FIG. 3 is a flow chart of the steps performed in the illustrative embodiment of the present invention.

FIG. 3 is a flow chart providing an overview of the steps performed in the illustrative embodiment of the present invention. The blocks in the illustrative embodiment of the present invention are logically partitioned to accommodate variable length of postings for words. In operation, the information retrieval interface 111 initializes the index file to provide the index file with an initial block. If the information retrieval interface 111 is required to allocate blocks of the index file to hold postings for words, the information retrieval interface 111 calculates the posting size for the word and determines the level having the closet matching block size (that is greater than or equal to the posting size) among those provided by various levels (step 303). The determined level is referred to as "level k." The size of the blocks in level k is at least as large as the calculated size of postings for the word.

The information retrieval interface 111 searches for a free block in the free block list of level j (step 305). The illustrative embodiment of the present invention keeps separate lists of free blocks for each level in the block structure. The information retrieval interface 111 maintains free block lists that identify available free blocks (i.e. blocks of memory that are free for allocation) in each level of block structure. If the information retrieval interface 111 calculates the size of postings for a word and determines level k as the closest matching level, the information retrieval interface 111 starts with the free block list of level k to search for an available free block (i.e. level j starts with level k). If a free block is not available in level k in the block structure, then the information retrieval interface 111 searches for an available free block from a free block list for the next closest level in the block structure. The next closest level is level k+1 (i.e. level j is equal to level k+1). If a free block is not available in the k+1 level, the information retrieval interface 111 searches for an available free block in a free block list of the next closest level (i.e. level j is equal to level k+2). This process is repeated until either an available free block is found or until the initial block in block structure is reached.

If a free block is not available for the posting of the word in any level of the block structure (step 307), the block structure increases the entire index file (step 309) and search an available free block. If a free block is available for the posting of the word in any size of levels in block structure, then the information retrieval interface 111 removes an available free block from free block list of the level (step 311). The free block is used for the postings for a word or even though the free block is not directly used for the postings for the word; rather one of child block of the free block is used for the postings for the word.

If the free block is found in level k (i.e. level j is equal to level k), the information retrieval interface 111 assigns a first free block of level k to the posting of the word (step 315). If a free block is found in other than level k (i.e. level j is greater than level k), the information retrieval interface 111 divides the free block of level j (step 317) and adds a divided free buddy block to a free block list for level j−1 (step 319). The first of two divided free blocks is considered as a current block (step 321) and the second divided free block that is a buddy block of the first is added to the free block list of level j−1. The information retrieval interface 111 repeats the steps 313, 315, 319 and 321 until the divided free block is in level k (step 313).

Figure 4A:
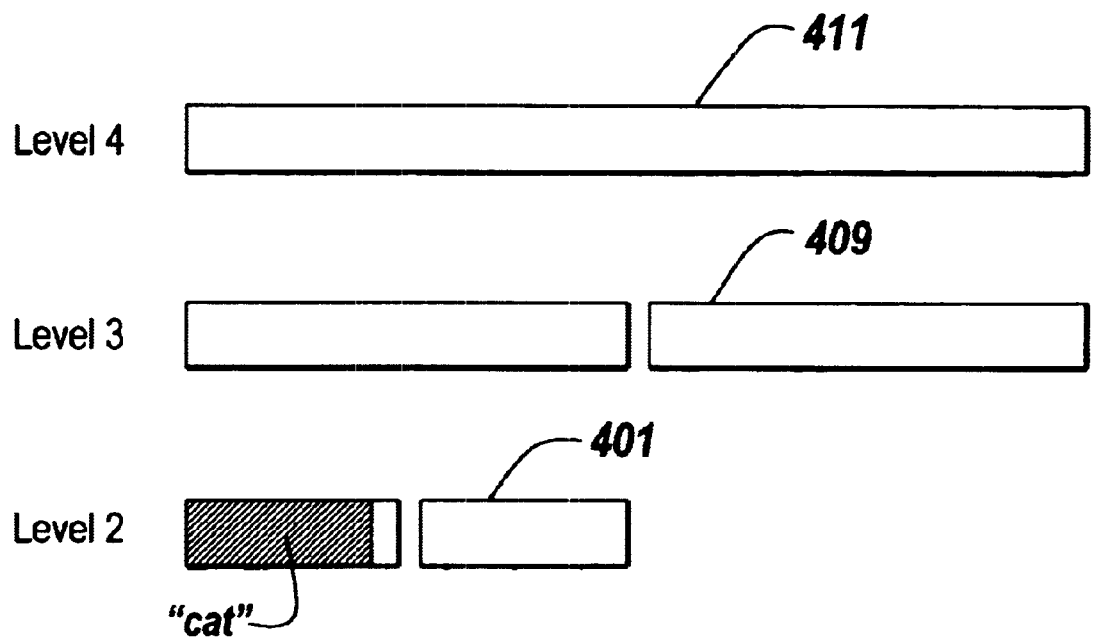
FIG. 4A is an example of index file in which a block is allocated to postings for a first word in the illustrative embodiment of the present invention.

FIG. 4A is an example of an index file allocating a block to postings for a first word in relation to the illustrative embodiment of the present invention shown in FIGS. 2 and 3. Initially, the word "cat" has been seen in a number of documents. For retrieval efficiency, the postings for "cat" should be stored in memory space in a sequential manner. The index file contains all the postings for all the words contained in documents of the database. If the word "cat" is seen in doc1, doc2, . . . , doc1002, . . . , doc1005, . . . , the postings for "cat" are [doc1, doc2, . . . , doc1002, . . . , doc1005, . . . ]. As shown in FIG. 4A, the postings for the "cat" can be accommodated by level 2. The block structure of the illustrative embodiment of the present invention partitions blocks to allocate the one of blocks in level 2 for storing the postings for the "cat." The largest block 411 is removed from the free block list, and a buddy block 409 in level 3 and a buddy block in level 2 are added to the free block lists.

Figure 4B:
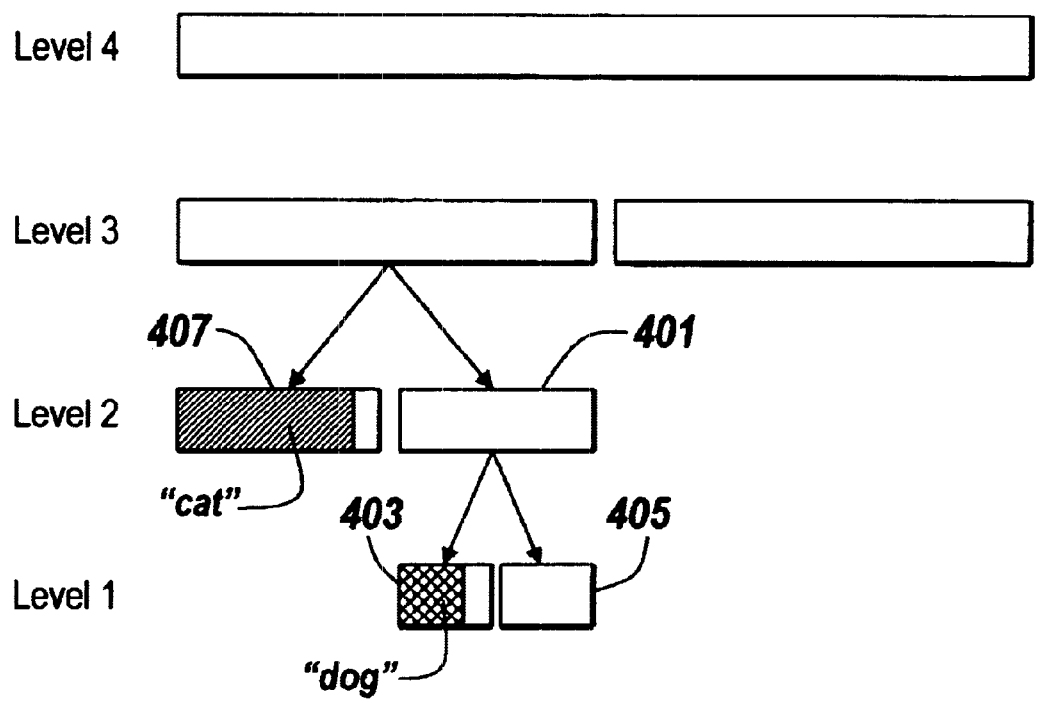
FIG. 4B is an example of index file in which blocks are allocated to postings for first and second words in the illustrative embodiment of the present invention.

FIG. 4B is an example of an index file allocating blocks for postings for first and second words. If the second word is "dog," and "dog" is seen in doc11, doc21, . . . , the postings for "dog" are [doc11, doc21, . . . ]. As shown in FIG. 4B, the postings for the "dog" can be accommodated by level 1. The free block 401 found in level 2 is partitioned into blocks 403 and 405 in level 1. Block 403 is allocated to the postings for "dog." Block 401 in level 2 is removed from the free block list, and the buddy block 405 in level 1 is added to the free block list.

Figure 4C:
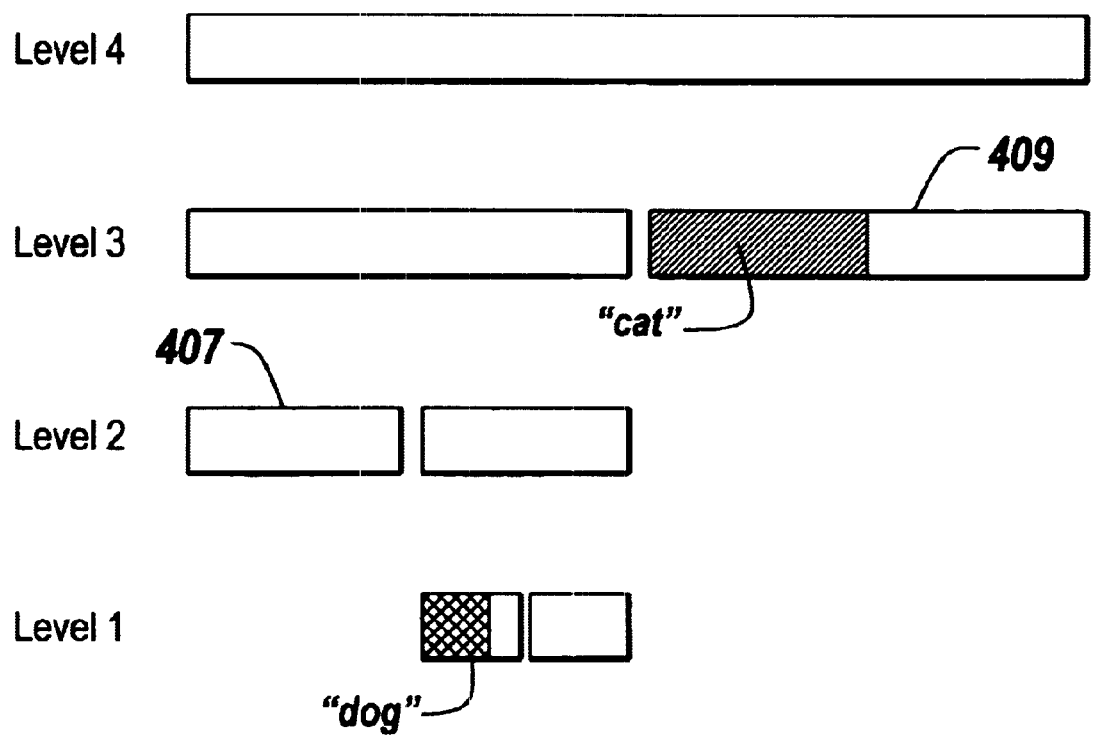
FIG. 4C is an example of index file in which a block is reallocated to postings for a first word in the illustrative embodiment of the present invention.

FIG. 4C is an example of index file updating postings for a first word in the illustrative embodiment of the present invention. Suppose that a new document containing the first word "cat" is inserted into the database (i.e. doc. 1111). The new posting for "cat" is [doc1, doc2, . . . , doc1002, . . . , doc1005, . . . , doc1111]; however there is no room to expand the postings for "cat" in block 407. The illustrative embodiment of the present invention searches for a free block that is able to accommodate the updated postings for "cat," as shown in FIG. 4C. The size of block 409 is doubled from the size of block 407 to accommodate the updated posting for "cat". The old postings are then moved to this new location with the new occurrence appended to the old postings. Block 409 is removed from the free block list, and block 407 is returned to the free block list.

Figure 5:
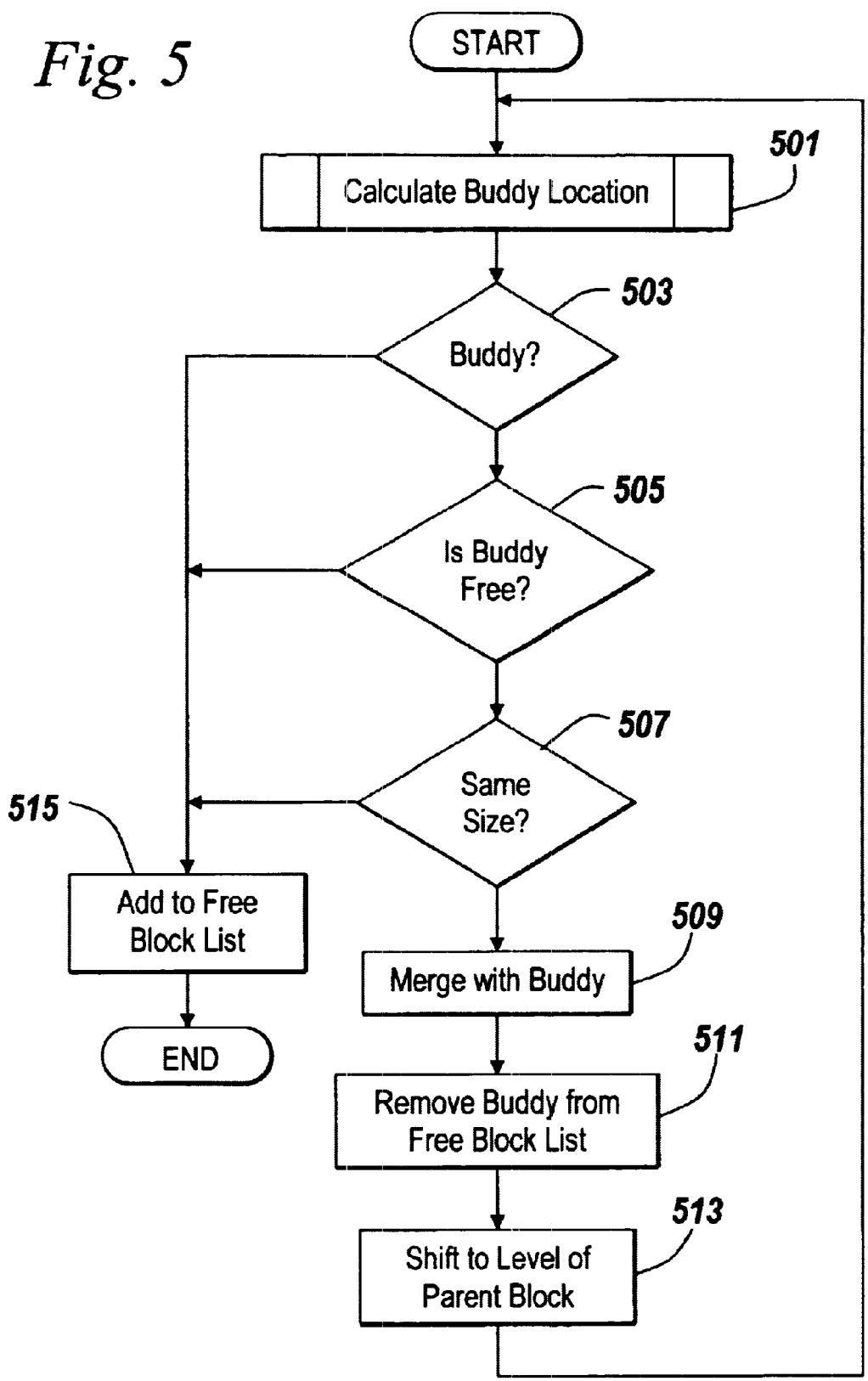
FIG. 5 is a flowchart of the detailed steps that are performed in the illustrative embodiment of the present invention to return free blocks to a free block list.

FIG. 5 is a flowchart of the detailed steps that are performed to return a free block to free block list. When a current block is to be deallocated, the status bit of the block is marked to have a value of a "0," which represents that the current block is free. When returning a free current block to the free block list for the level to which the current block belongs, the illustrative embodiment of the present invention first checks whether the current block can be combined with the buddy block into a larger free block. The buddy block must be free to be combined with the current block. The process of combining the free current block with the buddy block of the deallocated current block begins by computing the location of the buddy block (step 501). The calculation of buddy block location is described below in more detail. The information retrieval interface 111 checks if there is a buddy block (step 503). If the current block is an initial block in the top level of block structure shown in FIG. 2, the calculation of buddy block location returns no buddy block location. The initial block has no parent block and, therefore, just the current free block is added to the free block list for the level, to which the current block belongs (step 515). If the calculation of the buddy block location produces a buddy block location, the status bit of the buddy block is examined (step 505). If the TAG of the status bit for the buddy block is "1" (i.e., the status bit for the buddy block is not "0"), the buddy block cannot be combined and just the current free block is added to the free block list for the level to which the current block belongs (step 515). If the status bit for the buddy block has a value of "0", the size of the buddy block is examined (step 507). If the size of the buddy block is not the same size as the current block, the buddy block cannot be combined with the current block, and just the current free block is added to the free block list for the level to which the current block belongs (step 515). If the size of the buddy block is the same size of the current block, the buddy block is combined with the current block to make the parent block free (step 509). Additionally, the information retrieval interface 111 removes the buddy block from the free block list for the level to which the buddy block belongs (step 511). Next the parent block is viewed as the current block, and steps 501 through 511 are repeated to check the parent block can be combined with the buddy block of the parent block (step 513). This process then continues for the additional ancestors by considering the parent block as the current block and repeating the above-described steps 501 through 511. In this fashion, the largest free block is added to the free block list (step 515).

FIG. 6 is a flowchart of the detailed steps that are performed in calculation step 501 of buddy block location in FIG. 5. Each block in bock structure in the illustrative embodiment of the present invention has its offset address in its level. The information retrieval interface 111 uses the offset address of the deallocated current block and the size of the parent block of the deallocated current block. If there is no the remainder in dividing the offset address of the deallocated current block by the size of the parent block of the deallocated current block (step 601), the buddy block location of the deallocated current block is the location of the deallocated current block plus the block size of the level which the deallocated current block belongs to (step 603). If there is a remainder in dividing the offset address of the deallocated block by the size of the parent block of the deallocated block (step 601), the information retrieval interface 111 check if the remainder equals the block size of the level which the deallocated current block belongs to (step 605). If the remainder equals the block size of the level to which the deallocated block belongs (step 605), the buddy block location of the deallocated block is the location of the deallocated block minus the block size of the level to which the deallocated block belongs (step 607). If the remainder doesn't equal the block size of the level to which the deallocated block belongs (step 605), there is no buddy block of the deallocated current block (step 609). This means that the deallocated block is the initial block at the top level in block structure of the illustrative embodiment of the present invention.

It is apparent that there has been provided, in accordance with the present invention, a method and system for dynamically indexing documents of a database in a single phase. While this invention has been described in conjunction with illustrative embodiments thereof, it is evident that many alternatives, modifications, and variations will be apparent to those skilled in the art. For example, the present invention can be applied to an information retrieval or filtering system that has an index file partitioned into blocks where a parent block is partitioned into more than two child blocks. Accordingly, it is intended to embrace all such alternatives, modifications and variations that fall within the spirit and broad scope of the appended claims.

What is claimed is:

1. A method for allocating memory space for an index file of an information retrieval or filtering system to hold postings of words found in documents of a database, said method comprising steps of:

providing the index file with a predetermined sized initial block in the memory space;

partitioning the initial block into successively decreasing sized levels of blocks, wherein for each successive level said blocks are of a same size and a sum of the sizes of the blocks in each successive level equals the size of initial block; and allocating a given free block for holding postings of a first word in a selected one of the levels having blocks of a size that most closely matches a size of the postings of the first word in the index file, the size of said given free block being able to accommodate holding postings of the first word in the index file.

2. The method of claim 1 further comprising the steps of:

providing a free block list containing information about free blocks; and examining the free block list of memory space available for allocation to determine whether or not there is at least a free block that is able to accommodate a size of postings for a second word in the index file.

3. The method of claim 2 further comprising the step of increasing the size of the index file where it is determined there there is no free block in the free block list that is able to accommodate holding the postings for the second word in the index file.

4. The method of claim 2 further comprising the steps of:

where it is determined that there is at least one selected free block that is able to accommodate holding the postings for the second word in the index file, determining whether the selected free block is a closest sized block to the size of the postings for the second word in the index file; and where it is determined that said selected free block is not a closest sized block to the size of the postings for the second word in the index file, partitioning the selected free block into successively decreasing sized levels of blocks to find a closest sized free block that is able to accommodate holding the postings for the second word in the index file; and allocating the closest sized free block that is larger than the size of postings for the second word in the index file for holding the postings for the second word.

5. The method of claim 2 wherein said free block list contains information about free blocks in each successively decreasing level of free blocks and wherein said information identifies for each free block including whether or not the free block is free.

6. The method of claim 2 further comprising the steps of removing the selected free block from the free block list.

7. The method of claim 4 further comprising the steps of adding to the free block list buddy blocks that are not further partitioned into blocks, said buddy blocks being siblings of the block hat is further partitioned into blocks to find a closest sized free block to accommodate holding the postings for the second word in the index file.

8. A method for updating postings for words in an index file of an information retrieval or filtering system holding the postings for the words found in documents of a database, said method comprising steps of:

allocating free blocks of memory space available for holding the postings for the words found in the index file wherein the blocks are partitioned into successively decreasing levels of blocks in size, for each successive level the blocks are of a same size and a sum of the sizes of the blocks in one level equals a sum of the sizes of the blocks in another level, said allocating occurring in a selected one of the levels having blocks of a size that most closely matches a size of the postings of the first word in the index file;

updating postings for a word in a first block for holding additional postings for the word founded in added documents of the database;

searching from a free block list a second block that is free to accommodate holding the updated postings for the word, said free block list having information about free blocks in each successively decreasing level of free blocks; and moving the postings for the word from the first block to the second block.

9. The method of claim 8 wherein said searching step comprises the steps of;

where it is determined that there is no free block in the free block list that can accommodate holding the updated postings for the word, increasing the entire size of blocks allocated to the index file.

10. The method of claim 9 further comprising the steps of:

where it is determined that there is at least a free block that can accommodate holding the updated postings for the word in the index file, determining whether the second block is a closest sized block to the size of the updated postings for the word in the index file; and where it is determined that the second block is not a closest sized block to the size of the updated postings for the word in the index file, partitioning the second block into successively decreasing sized levels of blocks to find a closest sized free block to the size of the updated postings for the word in the index file.

11. The method of claim 8 further comprising the steps of removing the second free block from the free block list.

12. The method of claim 11 further comprising the step of adding to the free block list the buddy blocks that are not further partitioned into blocks, said buddy blocks being siblings of the block that is further partitioned into blocks to find a closest sized free block to the size of the updated postings for the word in the index file.

13. The method of claim 8 further comprising the steps of adding the first block to the free block list.

14. The method of claim 13 wherein said adding step comprises the steps of:

determining whether a buddy block of the first block is free or not; and where it is determined that a buddy block of the first block is free, combining the first block with the buddy block of the first block; and adding the combined block to the free block list.

15. A method for allocating an index file of an information retrieval or filtering system holding postings for words found in documents of a database, said method comprising steps of:

providing the index file with blocks wherein said blocks are partitioned into successively decreasing sized levels of blocks, said blocks in each successive level being of a same size, a sum of the sizes of the blocks in one level being equal to a sum of the sizes of the blocks in another level;

computing a size of postings for a word in the index file and determining a selected one of the levels that has blocks of a size that mostly matches the size of the postings for the word in the index file;

searching a free block within the first level to accommodate holding the postings for the word, said free block list containing information about free blocks of said selected one of the levels; and allocating the selected free block in said selected one of the levels to the postings for the word.

16. The method of claim 15 further comprising the steps of:

where it is determined that there is no free block within said selected one of the levels in the free block list, searching from the free block list a free block in a higher level than said selected one of the levels to accommodate holding the postings for the word.

17. The method of claim 15 further comprising the steps of:

where it is determined that there is no free block in higher successive levels in the free block list, increasing the size of the blocks.

18. The method of claim 15 further comprising the steps of:

where a free block is found in a higher level said selected one of the levels, partitioning the selected free block into successively decreasing sized levels of blocks to find a closest sized block that is able to accommodate holding the postings for the word; and allocating the closest sized block to the postings for the word.

* * * * *